United States Patent [19]

Chiquet

[11] Patent Number: 4,931,488

[45] Date of Patent: Jun. 5, 1990

[54] DEGRADABLE PLASTIC COMPOSITIONS

[75] Inventor: André Chiquet, Villars sur Glane, Switzerland

[73] Assignee: Amrotex AG., Glarus, Switzerland

[21] Appl. No.: 266,834

[22] Filed: Oct. 27, 1988

Related U.S. Application Data

[63] Continuation of PCT CH88/00042 filed Feb. 19, 1988, published as WO88/06609 on Sept. 7, 1988.

[30] Foreign Application Priority Data

Feb. 27, 1987 [CH] Switzerland .......................... 747/87

[51] Int. Cl.$^5$ .................................................. C08K 3/20
[52] U.S. Cl. ...................................... 523/126; 524/52; 524/398
[58] Field of Search ................... 523/126; 524/52, 398

[56] References Cited

U.S. PATENT DOCUMENTS

| | | | |
|---|---|---|---|
| 3,865,767 | 2/1975 | Boberg | 523/126 |
| 4,016,117 | 4/1977 | Griffin | 523/128 |
| 4,038,228 | 7/1977 | Taylor | 523/126 |
| 4,067,836 | 1/1978 | Potts et al. | 204/157.15 |

FOREIGN PATENT DOCUMENTS 1485833 9/1977 United Kingdom .

Primary Examiner—Joseph L. Schofer
Assistant Examiner—John J. Guarriello
Attorney, Agent, or Firm—Webb, Burden, Ziesenheim & Webb

[57] ABSTRACT

Composition based on thermoplastic polymers, especially α-olefine polymers, such as polyethylene or ethylene copolymers, to which have been added, to promote degradation, a biologically degradable substance, an iron compound possibly complex and soluble in the composition, an oxidizable substance having one or several double bonds, selected from fatty acids and/or fatty acid esters, as well a further possible compound of a transition metal with the exception of iron as a catalyst. Said compositions demonstrate a markedly improved degradation capability when exposed to heat and/or ultraviolet light and/or sunlight and/or when in conditions promoting decomposition.

6 Claims, No Drawings

DEGRADABLE PLASTIC COMPOSITIONS

This application is a continuation of PCT CH88/00042 filed Feb. 19, 1988, published as WO88/06609 on Sep. 7, 1988.

The invention relates to a plastic composition, the polymeric component of which comprises a thermoplastic polymer, especially a polymer of α-olefines, preferably polyethylene or ethylene copolymers, which composition disintegrates into small particles either under the action of heat and/or ultraviolet light and/or sunlight and/or under composting conditions. Since this plastic composition also contains a natural biodegradable substance, the small plastic particles formed are yet further degraded by microorganisms such as bacteria, fungi and/or enzymes which are present in a composting mixture or in the soil. Complete degradation can thus be achieved under suitable conditions.

The object of the present invention is to provide a plastic composition for films, sheets or other mouldings, which possess the desired properties of hitherto known thermoplastic materials, such as, for example, simple processing, high strength, waterproofness, good resistance to solvents and other chemicals, and fulfil the requirements to be met during storage and use, but which can be readily degraded after use under the abovementioned conditions. Under comparable conditions, the degradation time of the compositions according to the invention is shortened by at least half, frequently by ⅔ or even more as compared with hitherto known products of similar type.

British Patent Specification No. 1.485.833 has disclosed that plastics with carbon-carbon bonds can be rendered biodegradable by an addition of (a) starch granules or chemically modified starch granules and (b) an oxidizable substance such as a fatty acid and/or a fatty acid ester. It is also mentioned in this printed publication that, in contact with a transition metal salt contained in the soil, the oxidizable substance is oxidized to peroxide or hydroperoxide, whereupon splitting of the polymer chain occurs. However, it has been found that, in the case of a polyethylene film of this composition, most of the starch granules are covered by a polyethylene layer and can thus not be attacked by the microorganisms.

It has also been found that concentration of transition metal salts under usual composting conditions is insufficient to cause effective oxidation of the fatty acid component.

German Offenlegungsschrift 2.224.801 has disclosed that the degradation of thermoplastic polymers of α-olefines, especially polyethylene and polystyrene, under the action of ultraviolet light and/or sunlight can be accelerated by adding compounds of a transition metal, especially iron compounds, the effective content being stated as 0.01 to 2.0% by weight. It has been found, however, that these metal compounds are inert under normal exterior temperatures (below 35° C.) if light is excluded.

It has now been found, surprisingly, that

[1] a plastic composition which contains
(a) a biodegradable substance, for example starch,
(b) an iron compound which may be a complex and
(c) a fatty acid and/or fatty acid ester, degrades under the action of heat (preferably >50° C.)and/or ultraviolet light and/or insolation and/or under composting conditions;

[2] this degradation proceeds significantly faster than that measured according to the abovementioned patents (see the tables which follow), that is to say that the simultaneous presence of a biodegradable substance, an oxidizable substance and an iron compound leads to a significant synergistic effect; and

[3] the additional presence of a further transition metal compound such as, for example, copper-(II) stearate, exerts a catalytic effect on this degradation, which is additionally accelerated.

The present invention and its preferred embodiments are defined in the patent claims.

Suitable components (a) are biodegradable substances such as, for example, natural starch, etherified or esterified starch or starch which has been modified in another way, for example by means of silanes, the content being in general 2 to 40% by weight, preferably 10 to 16% by weight of the composition. Other carbohydrates can also be used for the desired purpose. It has proved to be advantageous to use the biodegradable substance in the form of granules, which can be completely homogeneously incorporated into the plastic mass in a known manner.

Component (c) is an oxidizable substance which contains at least one double bond, this substance being or containing a fatty acid and/or a fatty acid ester. A very suitable example is natural soya oil. The content of this oxidizable substance is in general up to 5% by weight, preferably 0.5 to 1.5% by weight, relative to the composition.

The iron compound representing component (b) corresponds to the general formula X-Fe, wherein X represents one or more ligands, and the compound can additionally be coupled to a further ligand Y. Fe here designates iron in any known valency. The ligand X can be an inorganic or organic acid radical and likewise another ligand bonded in a complex. The following examples may be mentioned: $OH^-$, $Cl^-$, $Br^-$, $I^-$, oxalate$^-$, H-citrate$^-$, $NO_2^-$, $N_3^-$, EDTA or a carbonyl, nitrosyl or porphyrin radical. Examples of suitable ligands Y are carboxylic acid ions of aromatic or aliphatic monocarboxylic acids or of dicarboxylic acids, the aliphatic carboxylic acid preferably having 10 to 20 carbon atoms. The ligand Y serves in general to increase the solubility of the compound X-Fe in the polymer. The content of component (b) is in general at least 0.01% by weight, preferably 0.05 to 0.5% by weight, relative to the composition. The content can be 0.02, 0.03 or 0.04% by weight, but it can also exceed 5.0% by weight.

The catalyst which may be added is a transition metal compound, which may be a complex, of the general formula Z'-Me, wherein Me designates a transition metal other than Fe nd Z' designates one or more ligands. The following may be mentioned as examples of the ligand Z': $OH^-$, $Cl^-$, $Br^-$, $I^-$, oxalate$^-$, H-citrate$^-$, $NO_2^{--}$, $N_3^{--}$, EDTA as well as carboxylic acid ions of aromatic or aliphatic monocarboxylic or dicarboxylic acids, the aliphatic carboxylic acid preferably having 10 to 20 carbon atoms. Suitable transition metals Me are mainly the transition metals of the first transition metal row in the periodic table, such as copper and vanadium. The content of this catalyst component is at least 0.001% by weight, preferably 0.005 to 1.0% by weight and especially 0.01 to 0.05% by weight.

The thermoplastic base composition consists essentially of any known thermoplastic polymer, polymers of α-olefines, especially polyethylene or ethylene copolymers, being preferred. "Polyethylene" is here to be understood as any type of polyethylene, such as LDPE, LLDPE, LMDPE, MDPE, HDPE, ULDPE etc. Examples of suitable ethylene copolymers are EVA, EBA, EAA, EMAA and ionomers.

The present invention has the advantage that the degradation can be controlled depending on the field of application by varying the concentration of the individual components, without the plastic material suffering a deterioration in its properties under the normal use conditions. Particularly interesting fields of application of the compositions according to the invention are packaging materials, films for garbage bags for compostable wastes, agricultural films, in particular those which come into contact with the soil and are intended to disintegrate after a desired time, films and sheets for carrier bags, sheeting used on building sites, plastic fibres and plastic tapes, especially stretched plastic tapes, and the like.

The present invention makes it possible to manufacture products which do not pollute the environment and which can be degraded without additional energy consumption and without releasing harmful substances.

The production of the compositions according to the invention and their processing to give sheets, films, plates or other shapes is carried out by conventional methods. With advantage, the components are added individually or as mixtures in the form of so-called master batches.

As far as is known so far or can be assumed as probable, the degradation proceeds by the following mechanism:

As is known (see A. C. Albertsson, B. Ranby, J. Appl. Polym. Sci: Appl. Polym. Symp., 35 (1979), p. 423 and the publication of A. C. Albertsson mentioned therein), plastics with C—C bonds in the main chain are biodegradable extremely slowly with the formation of $CO_2$ and $H_2O$. The half life of biological degradation of polyethylene was extrapolated to be about 100 years.

Under the action of ultraviolet light, sunlight or heat or under composting conditions, free radicals such as, for example, OH• are formed due to the presence of the iron ions, and these can react with the polymers, forming other free radicals. These free polymer radicals are extremely reactive and can, inter alia, react further with oxygen, with other chains, with iron ions, with a double bond of the oxidizable substance, and the like. Polymer chains are thus split, small chains with or without oxygen-containing groups, such as alcohols, ketones, esters etc. being formed. During this process, the iron ions act both as an initiator and as a reaction promoter, whereas the oxidizable substance acts as a reaction promoter and especially as a chain splitter, since this substance has a greater tendency than a saturated polymer chain to form peroxy or hydroperoxy compounds, and starch, because of the large number of hydroxyl groups in its composition, manifests itself as a promoter and, in conjunction with the iron ions, as a particularly valuable co-initiator, since iron-(III) hydroxide complexes are highly reactive. This can be illustrated by the following equation (1):

$$Fe^{3+} + OH^- \rightarrow [FeOH]^{2+} \rightarrow Fe^{2+} + OH^• \quad (1)$$

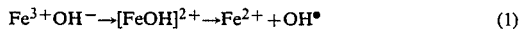

The observed catalytic effect of the transition metal compounds, for example copper or vanadium compounds, is probably to be attributed to an acceleration of the $Fe^{3+} \rightarrow Fe^{2+} \rightarrow Fe^{3+}$ cycle. Without these compounds, the $Fe^{2+}$ formed according to equation (1) is reoxidized by other free radicals or other intermediates at the expense of chain splitting as, for example, shown in equation (2):

$$Fe^{2+} + ROOH \rightarrow Fe^{3+} + OH^- + RO^• \quad (2)$$

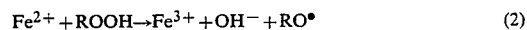

In the presence of copper compounds, the $Fe^{2+}$ formed is reoxidized faster according to equation (3):

$$Fe^{2+} + Cu^{2+} \rightarrow Fe^{3+} + Cu^+ \quad (3)$$

and $Cu^+$ ions are reoxidized very fast to $Cu^{2+}$ ions by free radicals:

$$Cu^+ + RO^• \rightarrow Cu^{2+} + RO^- \quad (4)$$

This process repeats itself as long as the polymer is exposed to the ultraviolet light, sunlight or heat. In this phase, to be described as the first phase, the plastic materials become brittle and fragile and disintegrate into small particles of a few $mm^2$ up to few $cm^2$. Depending on the prevailing conditions, this phase takes in general 10 to 60 days.

In the subsequent second stage, the following can be observed:

[A] Under the action of ultraviolett light, sunlight or heat, the degradation process continues as in the first stage. The small particles disintegrate further into smaller and smaller particles until they disappear.

[B] In the presence of microorganisms, that is to say bacteria, fungi and/or enzymes, such as occur under composting conditions or in contact with the soil, a further degradation stage follows. Due to the disintegration into small particles, the area of the starch subject to attack by the microorganisms is enlarged several times. The starch is completely biodegraded, whereas the oxygen-containing, split polymer chains are degraded at least partially. Depending on the prevailing conditions, the degradation processes of the first stage can still continue, leading to even shorter oxygen-containing polymer chains which, due to the close contact with the microorganisms or enzymes, are in turn partially degraded further. In this way, complete biodegradation at the end of the second stage can be achieved. In general, this takes place, for example, under usual composting conditions which comprise temperatures of up to 75°–80° C. and gradually adjust to the exterior temperature in the course of 6 to 8 months.

Such a two-stage degradation is advisable especially in the case of agricultural sheets which are in contact with the soil, or of scattered wastes. After the first stage, the plastic particles are then so small that they can penetrate under exterior influences, e.g. rain, into the soil. They are then not accessible to light anymore so that a biological degradation of starch can take place which would not occur in the case of conventional photodegradable plastic composition.

EXAMPLES

The films A–Q were produced by the blown film extrusion process in the conventional manner, with the use of master batches. They all had comparable thickness. Film A did not contain any degradation-promoting additive. Films B and C, which did not contain all the required additives, serve as comparative tests. The varying contents of silicone-modified starch, iron hydroxide stearate, soya oil and copper stearate can be seen from Table 1. The change in tensile strength and elongation at break at different temperatures, under composting conditions and under UV conditions was measured for each composition as a function of time. At an elongation at break of less than 5% in the transverse direction, the product is so fragile and brittle that measurements are no longer possible, so that the film can be regarded as degraded.

The results of the investigations can be seen from Tables 2 to 7 which follow.

TABLE 1

Film compositions
Additives in % by weight

| Composition No. | starch | FeOH (stearate)₂ | soya oil | Cu (stearate)₂ | Film thickness in μm |
|---|---|---|---|---|---|
| A | — | — | — | — | 55 |
| B | 10 | — | 0,5 | — | 60 |
| C | — | 0,05 | — | — | 55 |
| D | 10 | 0,05 | 0,5 | — | 58 |
| E | 10 | 0,1 | 0,5 | — | 62 |
| F | 16 | 0,05 | 0,8 | — | 55 |
| G | 10 | 0,15 | 0,5 | — | 56 |
| H | 10 | 0,05 | 1,0 | — | 58 |
| I | 10 | 0,05 | 0,5 | 0,025 | 57 |

Plastic: LDPE, melt index 1,2

Change in tensile strength and elongation at break at 65° C.

TABLE 2a

| | | A | B | C | D |
|---|---|---|---|---|---|
| Tensile strength in N | | | | | |
| Original | longitudinal | 30,1 | 19,6 | 29,3 | 19,2 |
| | transverse | 28,5 | 17,6 | 27,3 | 19,0 |
| 6 days | longitudinal | 29,3 | 18,6 | 18,7 | 17,6 |
| | transverse | 28,8 | 17,9 | 19,6 | 13,7 |
| 10 days | longitudinal | 30,7 | 17,7 | 16,0 | 15,1 |
| | transverse | 27,9 | 16,6 | 13,7 | 12,2 |
| 15 days | longitudinal | 30,5 | 19,1 | 15,5 | 14,0 |
| | transverse | 28,9 | 16,1 | 14,0 | 12,5 |
| 20 days | longitudinal | 29,2 | 18,1 | 14,3 | 13,5 |
| | transverse | 27,9 | 15,5 | 14,4 | 13,0 |
| 30 days | longitudinal | 30,0 | 18,5 | 13,6 | 12,5 |
| | transverse | 28,5 | 15,8 | 14,0 | 12,1 |
| Elongation at break in % | | | | | |
| original | longitudinal | 390 | 233 | 258 | 232 |
| | transverse | 515 | 530 | 520 | 531 |
| 6 days | longitudinal | 402 | 239 | 217 | 167 |
| | transverse | 505 | 539 | 437 | 346 |
| 10 days | longitudinal | 388 | 226 | 95 | 86 |
| | transverse | 508 | 518 | 109 | 27 |
| 15 days | longitudinal | 395 | 195 | 67 | 22 |
| | transverse | 520 | 500 | 47 | 11 |
| 20 days | longitudinal | 375 | 203 | 54 | 15 |
| | transverse | 495 | 462 | 41 | 9 |
| 30 days | longitudinal | 385 | 185 | 44 | 10 |
| | transverse | 495 | 430 | 37 | 5,8 |

| | | E | F | G | H | I |
|---|---|---|---|---|---|---|
| Tensile strength in N | | | | | | |
| Original | longitudinal | 13,8 | 14,0 | 14,2 | 19,5 | 19,8 |
| | transverse | 9,3 | 8,9 | 9,8 | 19,1 | 18,9 |
| 10 days | longitudinal | 11,8 | 10,7 | 9,6 | 15,5 | 14,5 |
| | transverse | 8,7 | 8,0 | 9,5 | 13,0 | 13,5 |
| 20 days | longitudinal | 10,5 | 9,8 | 9,1 | 12,5 | 13,2 |
| | transverse | 9,2 | 7,9 | 8,1 | 12,0 | 12,2 |
| 25 days | longitudinal | 9,5 | 8,8 | 8,3 | 12,0 | 12,5 |
| | transverse | 8,2 | 7,1 | 7,7 | 11,2 | 11,7 |
| 30 days | longitudinal | 9,2 | 8,7 | 7,5 | 11,0 | 12,0 |
| | transverse | 9,2 | 7,8 | 7,7 | 10,5 | 11,2 |
| Elongation at break in % | | | | | | |
| Original | longitudinal | 162 | 132 | 163 | 241 | 237 |
| | transverse | 434 | 304 | 400 | 525 | 521 |
| 10 days | longitudinal | 109 | 71 | 12 | 88 | 75 |
| | transverse | 35 | 7,4 | 6,7 | 25 | 15 |
| 20 days | longitudinal | 38 | 11 | 6,3 | 14 | 13 |
| | transverse | 9,2 | 4,7 | 4,2 | 8,2 | 6,3 |
| 25 days | longitudinal | 9,4 | 7,7 | 5,4 | 9,1 | 7,5 |
| | transverse | 6,2 | 4,0 | 3,9 | 6,2 | 4,9 |

TABLE 2a-continued

| 30 days | longitudinal | 7,1 | 5,4 | 4,3 | 7,4 | 5,0 |
|---|---|---|---|---|---|---|
| | transverse | 5,1 | 3,8 | 3,7 | 4,3 | 4,2 |

Change in tensile strength and elongation at break of film D at 70° C. and 75° C.

TABLE 2b

| | | 70° C. | 75° C. |
|---|---|---|---|
| Tensile strength in N | | | |
| Original | longitudinal | 19,2 | 19,2 |
| | transverse | 19,0 | 19,0 |
| 6 days | longitudinal | 15,4 | 15,2 |
| | transverse | 12,4 | 13,6 |
| 10 days | longitudinal | 13,6 | 14,4 |
| | transverse | 12,9 | 13,8 |
| 15 days | longitudinal | 14,1 | 11,7 |
| | transverse | 12,9 | 12,1 |
| 20 days | longitudinal | 14,1 | 8,6 |
| | transverse | 13,7 | 10,8 |
| Elongation at break in % | | | |
| original | longitudinal | 232 | 232 |
| | transverse | 531 | 531 |
| 6 days | longitudinal | 103 | 42 |
| | transverse | 86 | 12 |
| 10 days | longitudinal | 41 | 9 |
| | transverse | 14 | 8 |
| 15 days | longitudinal | 18 | 4,4 |
| | transverse | 10 | 4,3 |
| 20 days | longitudinal | 11 | 3,4 |
| | transverse | 7 | 3,6 |

Degradation under composting conditions

TABLE 3

| | | A | B | C | D |
|---|---|---|---|---|---|
| Tensile Strength in N | | | | | |
| Original | longitudinal | 30,1 | 19,4 | 26,7 | 20,6 |
| | transverse | 28,5 | 15,7 | 26,8 | 16,0 |
| 3 weeks | longitudinal | 29,7 | 19,2 | 25,1 | 19,9 |
| | transverse | 28,0 | 15,4 | 15,4 | 15,5 |
| 7 weeks | longitudinal | 29,2 | 20,8 | 21,3 | 20,1 |
| | transverse | 28,3 | 14,3 | 22,2 | 12,6 |
| 13 weeks | longitudinal | 30,2 | 18,5 | 25,0 | 19,2 |
| | transverse | 27,6 | 14,0 | 21,7 | 11,5 |
| 20 weeks | longitudinal | 29,5 | 18,4 | 22,0 | 18,9 |
| | transverse | 27,7 | 13,2 | 16,1 | 12,7 |
| Elongation at break in % | | | | | |
| Original | longitudinal | 390 | 282 | 286 | 253 |
| | transverse | 515 | 752 | 638 | 667 |
| 3 weeks | longitudinal | 385 | 231 | 247 | 190 |
| | transverse | 500 | 476 | 206 | 437 |
| 7 weeks | longitudinal | 370 | 170 | 107 | 128 |
| | transverse | 480 | 314 | 534 | 143 |
| 13 weeks | longitudinal | 400 | 252 | 198 | 205 |
| | transverse | 510 | 537 | 534 | 114 |
| 20 weeks | longitudinal | 385 | 152 | 153 | 174 |
| | transverse | 495 | 263 | 570 | 300 |

Degradation under composting conditions

TABLE 4

Film composition
Additives in % by weight

| Composition No. | Starch | FeOH (stearate)₂ | Soya oil | Cu (stearate)₂ | Film thickness in μm |
|---|---|---|---|---|---|
| J | 11 | 0,10 | 1,3 | — | 55 |
| K | 11 | 0,15 | 1,3 | — | 58 |
| L | 11 | 0,15 | 1,3 | 0,025 | 56 |

Plastic: LDPE, melt index 0,8

TABLE 5

Evaluation of tensile strength and of the elongation under composting conditions

|  |  | J | K | L |
|---|---|---|---|---|
| Tensile strength in N | | | | |
| Original | longitudinal | 16,8 | 16,5 | 16,1 |
|  | transverse | 9,8 | 10,3 | 16,0 |
| 1 week | longitudinal | — | — | 16,0 |
|  | transverse | — | — | 10,3 |
| 4 weeks | longitudinal | 16,5 | 16,1 | 15,9 |
|  | transverse | 9,1 | 9,0 | 8,2* |
| 7 weeks | longitudinal | 16,6 | 16,4 | 15,2 |
|  | transverse | 8,9 | 8,8* | 7,8* |
| 10 weeks | longitudinal | 16,3 | 16,1 | 15,1 |
|  | transverse | 8,7* | 8,3* | 7,7* |
| 15 weeks | longitudinal | 15,9 | 15,6 | — |
|  | transverse | 8,5* | 8,3* | — |
| 20 weeks | longitudinal | 15,8 | 15,1 | — |
|  | transverse | 8,6* | 7,8* | — |
| Elongation in % | | | | |
| Original | longitudinal | 154 | 126 | 185 |
|  | transverse | 422 | 436 | 361 |
| 1 week | longitudinal | — | — | 153 |
|  | transverse | — | — | 121 |
| 4 weeks | longitudinal | 135 | 106 | 145 |
|  | transverse | 143 | 43 | 71* |
| 7 weeks | longitudinal | 130 | 107 | 132 |
|  | transverse | 95 | 36* | 30* |
| 10 weeks | longitudinal | 121 | 103 | 129 |
|  | transverse | 86* | 42* | 25* |
| 15 weeks | longitudinal | 115 | 101 | — |
|  | transverse | 84* | 40* | — |
| 20 weeks | longitudinal | 114 | 85 | — |
|  | transverse | 84*. | 35* | — |

*Holes/Fractures in the film are observed in a number increasing with time. Measurements are done on samples without any hole.

Degradation under ultraviolet light

TABLE 6

Film composition
Additives in % by weight

| Composition No. | Starch | FeOH (stearate)₂ | Soya oil | Cu (stearate)₂ | Film thickness in μm |
|---|---|---|---|---|---|
| M | — | — | — | — | 100 |
| N | — | 0,15 | — | — | 58 |
| O | 10 | — | 1,3 | — | 56 |
| P | 10 | 0,15 | 1,3 | — | 54 |
| Q | 10 | 0,15 | 1,3 | 0,025 | 56 |

Plastic: LDPE, melt index 0,8

TABLE 7

Evalution in the time of the tensile strength and of the elongation under ultraviolet light [XENOTEST 250]

|  | M | N | O | P | Q |
|---|---|---|---|---|---|
| Tensile strength in transverse direction in N | | | | | |
| Original | 32,7 | 17,7 | 13,4 | 9,4 | 10,3 |
| 104 hrs | 27,4 | — | 12,5 | 7,3 | 8,1* |
| 150 hrs | — | 11,8 | 11,6 | 7,2* | 6,7* |
| 209 hrs | 26,6 | 10,6 | 11,5 | 5,3* | — |
| 250 hrs | — | 11,4 | — | — | — |
| 305 hrs | 27,8 | 11,5 | — | — | — |
| Elongation in transverse direction in % | | | | | |
| Original | 734 | 630 | 527 | 385 | 361 |
| 104 hrs | 634 | — | 369 | 6,7 | 4,5* |
| 150 hrs | — | 30 | 367 | 4,0* | 3,5* |
| 209 hrs | 672 | 17 | 231 | 2,9* | — |
| 250 hrs | — | 10 | — | — | — |
| 305 hrs | 669 | 6,8 | — | — | — |

*brittle

The results of the above tables clearly show the synergistic effect of components (a), (b) and (c) on the degradation of polyethylene polymers.

I claim:

1. Thermoplastic composition, which is degradable under the action of heat and/or ultraviolet light and/or sunlight and/or composting conditions and which comprises as a polymeric compound thermoplastic polymers of α-olefins selected from the group consisting of polyethylene and ethylene copolymers, characterized in that the composition contains the following degradation-promoting additives:

(a) a biodegradable substance selected from the group consisting of natural starch, an etherified or esterified starch or a hydrophobically modified derivative thereof, (b) FeOH(stearate)₂ as an iron compound which is soluble in the composition and which acts as an initiator and promotes further degradation, and (c) an oxidizable substance which has one or more double bonds and acts as a degradation promoter and chain splitter, this substance being a fatty acid, a fatty acid ester or a mixture thereof.

2. Composition according to claim 1, characterized in that the content of component (a) is 10 to 16% by weight, and the content of component (b) is 0.05 to 0.5% by weight, relative to the composition.

3. Composition according to claim 1 characterized in that the content of component (c) is up to 5% by weight, preferably 0.5 to 1.5% by weight.

4. Composition according to claims 1, 2 or 3, characterized in that componet (c) consists of or contains one or more constituents of soya oil.

5. Composition according to claims 1, 2 or 3, characterized in that it additionally contains, as a catalyst, a further compound, which may be a complex, of a transition metal other than iron.

6. Composition according to claim 5, characterized in that the content of additional transition metal compound is at least 0.001% by weight relative to the composition.

* * * * *